(12) United States Patent
Kubota

(10) Patent No.: US 7,925,153 B2
(45) Date of Patent: *Apr. 12, 2011

(54) IMAGING APPARATUS AND CONTROL METHOD THEREOF

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,475

(22) Filed: Jul. 14, 2010

(65) Prior Publication Data

US 2010/0284678 A1 Nov. 11, 2010

Related U.S. Application Data

(62) Division of application No. 12/105,579, filed on Apr. 18, 2008, now Pat. No. 7,783,189.

(30) Foreign Application Priority Data

Apr. 24, 2007 (JP) .................................. 2007-114505

(51) Int. Cl.
G03B 7/00 (2006.01)

(52) U.S. Cl. ........................................ 396/213; 348/362

(58) Field of Classification Search .................. 396/213; 348/362

See application file for complete search history.

(56) References Cited

U.S. PATENT DOCUMENTS

| 5,517,243 | A * | 5/1996 | Kudo et al. | 348/296 |
| 7,783,189 | B2 * | 8/2010 | Kubota | 396/374 |
| 2008/0267608 | A1 * | 10/2008 | Kubota | 396/374 |

* cited by examiner

Primary Examiner — Rodney E Fuller
(74) Attorney, Agent, or Firm — Canon U.S.A., Inc. I.P. Division

(57) ABSTRACT

An imaging apparatus includes an image sensor, a diaphragm control unit configured to control an aperture value of a diaphragm, and an electronic shutter control unit configured to control an operation of an electronic shutter for adjusting a charge accumulation time of the image sensor by adjusting a driving timing of the image sensor, wherein, if driving of the diaphragm overlaps a charge accumulation time when the aperture value is changed from a first aperture value to a second aperture value, the electronic shutter control unit controls a time of charge accumulation corresponding to the second aperture value in the charge accumulation time such that a brightness of an image signal output from the imaging unit when the first aperture value is set and a brightness of an image signal output from the imaging unit when the second aperture value is set become approximately equal to each other.

10 Claims, 12 Drawing Sheets

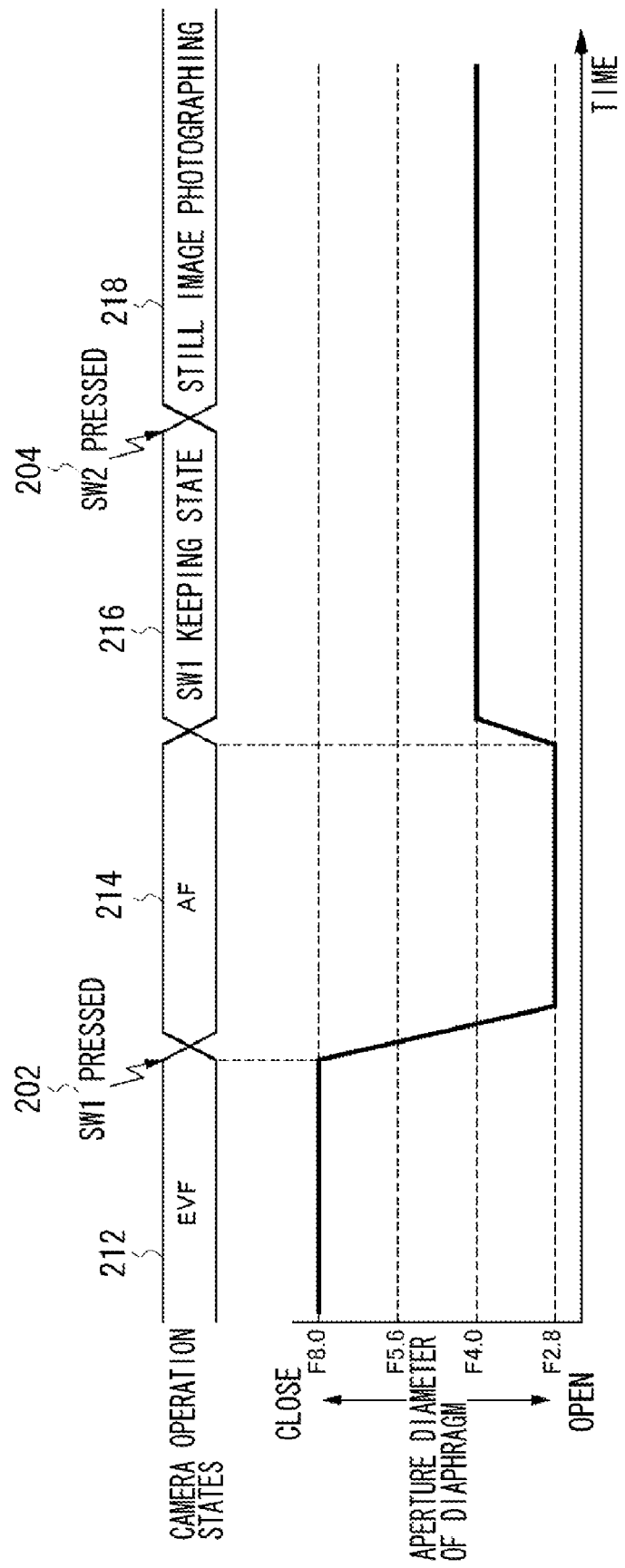

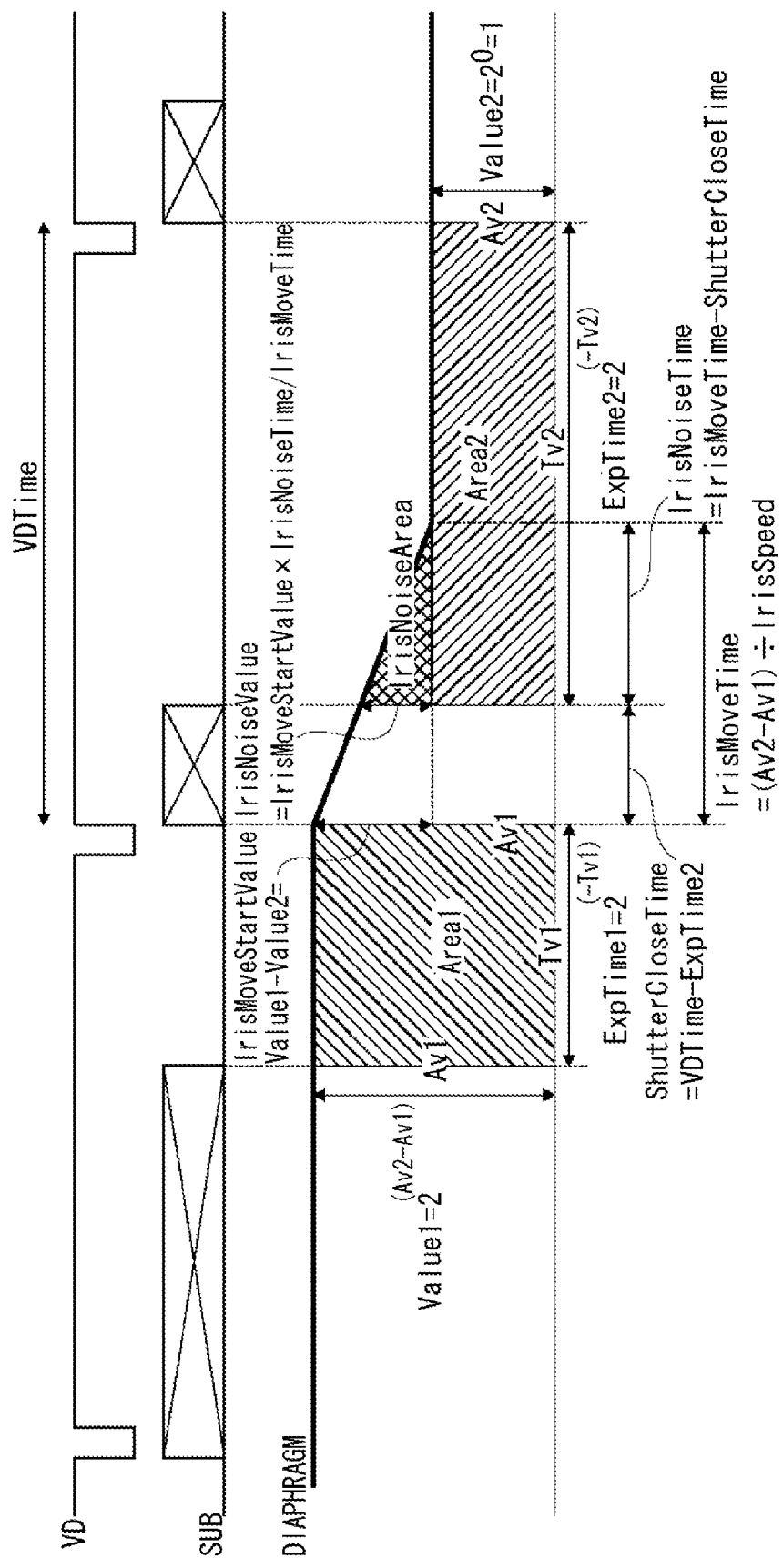

IMAGING APPARATUS AND CONTROL METHOD THEREOF

CROSS REFERENCE TO RELATED APPLICATIONS

The present application is a divisional of U.S. patent application Ser. No. 12/105,579 (now U.S. Pat. No. 7,783,189), filed Apr. 18, 2008, entitled "IMAGING APPARATUS AND CONTROL METHOD THEREOF", the content of which is expressly incorporated by reference herein in its entirety. Further, the present application claims priority from Japanese Patent Application No. 2007-114505, filed Apr. 24, 2007, which is also hereby incorporated by reference herein in its entirety.

BACKGROUND OF THE INVENTION

1. Field of the Invention

The present invention relates to an exposure control technique for an imaging apparatus such as a digital camera.

2. Description of the Related Art

A camera typically has a viewfinder for capturing an object upon photographing. There are two prominent types of viewfinders, namely an optical type viewfinder and an electronic type viewfinder.

Optical viewfinders include those used for a single-lens reflex camera in which light having passed through a photographic optical lens is bent with a mirror and those in which an object is viewed through a viewfinder window without using a photographic optical lens.

Electronic viewfinders are typically used for the recently common compact digital still cameras. More specifically, in electronic viewfinders, an image sensor, such as a charge-coupled device (CCD), to be used when photographing an object receives light having passed through a photographic lens and photoelectrically converts the light into an image signal to display the image signal on an image display device, such as a liquid crystal device (LCD), in sequence. With such a configuration, since the same image sensor can be used both upon viewing and photographing, a finder coverage of 100% can be achieved with ease. Such a configuration of the electronic viewfinder has a greater advantage in finder coverage than that of the optical viewfinder.

The image sensor is applicable not only to a still image photographing and a viewfinder but also to the other purposes. Examples of the other purposes include auto focus (AF) control, in which a focus adjustment to an object is performed automatically, and auto exposure (AE) control, in which a brightness adjustment of the object is appropriately controlled. Upon AF control or upon AE control, the image sensor is used as a range-finding sensor or a light metering sensor, respectively. As described above, there may be such a case where the image sensor performs a photographing preparation operation, such as AF control and AE control, while it serves as a viewfinder for a user to monitor an object image.

A camera includes a diaphragm (iris) for adjusting an amount of incident light and a shutter for adjusting an exposure time. A digital camera includes, in addition thereto, a gain control unit for amplifying/attenuating a signal level read from the image sensor after the image sensor has received light. It should be considered that a diaphragm mechanism not only changes an exposure but also changes a depth of field according to an aperture diameter of the diaphragm. In the diaphragm, as the aperture diameter of the diaphragm becomes larger, the depth of field becomes shallower; and as the aperture diameter of the diaphragm becomes smaller, the depth of field becomes deeper. Taking this optical phenomenon into consideration, it is known that a focus can be prevented from shifting according to the field depth upon photographing by shifting the diaphragm to a full-aperture position upon AF control, namely, by adjusting the focus in the field depth shallower than the focus in the field depth upon photographing a still image.

In a camera with an AF function and AE function, a typical release button moves in two stages when the user operates it for photographing an image. In other words, such a typical camera has a configuration that the AF function and AE function are performed to adjust a focus and an exposure for photographing a still image when the user half-presses the release button, whereas a photographing operation starts when the user fully presses the release button. Hereinafter, the half-press of the release button is referred to as an SW1 operation and a full-press of the release button is referred to as an SW2 operation.

When the AF control is performed with the SW1 operation, as described above, the diaphragm is driven to be shifted to a full-aperture position upon AF control. If the diaphragm is preliminarily set to an aperture diameter to be used in photographing a still image after the AF control has been completed, the diaphragm is no longer required to be driven after the SW2 operation. Thus, a shutter release time lag can be shortened. As described above, as a certain amount of time is required for driving the diaphragm because the diaphragm has a mechanical structure, Japanese Patent No. 03817563 addresses this problem.

Since a certain amount of time is required for diaphragm control, if the diaphragm is driven while the user is using the image sensor as a viewfinder, namely, the user is monitoring an object image, a problem arises in that a deteriorated image may be output to an image display device during an operation of the diaphragm. With respect to such a problem, Japanese Patent Application Laid-Open No. 2006-352905 discusses a method of displaying an image obtained before driving the diaphragm without updating an image displayed on the image display device when the diaphragm is being driven. However, this method may not be a suitable solution in using the image sensor as a viewfinder for capturing the movement of an object, because an image updating operation once appears to be stopped.

Also, Japanese Patent Application Laid-open No. 11-112865 discusses a method of controlling a diaphragm not to move under a certain condition so as to avoid showing the image quality deterioration through the viewfinder upon controlling the diaphragm, or to avoid recording the deteriorated image as a moving image. However, this method may cause a problem that a range for following an object luminance value becomes narrower due to the stoppage of the diaphragm, thus causing a deterioration of the AE performance.

As described above, an image sensor for photographing a still image can be used, alone or in combination, for various purposes, such as for a viewfinder, AF control, AE control, or photographing a moving image, and the diaphragm is driven depending on the requirements, such that a good photographed image can be obtained with a good response. However, there is a case where the image quality deterioration occurs due to the drive of the diaphragm while the camera user is capturing the object image by using the image sensor as a viewfinder. In such a case, there is a problem of notable deterioration of an electronic viewfinder performance.

SUMMARY OF THE INVENTION

The present invention is directed to preventing or reducing a deterioration in image quality, which may occur when a diaphragm is driven, without degrading a viewfinder performance and AE control performance.

According to a first aspect of the invention, an imaging apparatus includes an imaging unit including an image sensor configured to photoelectrically convert an object image to accumulate electric charge, a diaphragm control unit configured to control an aperture value of a diaphragm configured to adjust an amount of light incident on the image sensor, and an electronic shutter control unit configured to control an operation of an electronic shutter for adjusting a charge accumulation time of the image sensor by adjusting a driving timing of the image sensor, wherein, if driving of the diaphragm overlaps a charge accumulation time when the aperture value is changed from a first aperture value to a second aperture value, the electronic shutter control unit controls a time of charge accumulation corresponding to the second aperture value in the charge accumulation time such that a brightness of an image signal output from the imaging unit when the first aperture value is set and a brightness of an image signal output from the imaging unit when the second aperture value is set become approximately equal to each other.

According to a second aspect of the invention, an imaging apparatus includes an imaging unit including an image sensor configured to photoelectrically convert an object image to accumulate electric charge, a diaphragm control unit configured to control an aperture value of a diaphragm configured to adjust an amount of light incident on the image sensor, an electronic shutter control unit configured to control an operation of an electronic shutter for adjusting a charge accumulation time of the image sensor by adjusting a driving timing of the image sensor, and a gain control unit configured to control a gain of an image signal output from the imaging unit, wherein, if driving of the diaphragm overlaps a charge accumulation time when the aperture value is changed from a first aperture value to a second aperture value, the gain control unit controls a gain corresponding to the second aperture value in the charge accumulation time such that a brightness of an image signal output from the imaging unit when the first aperture value is set and a brightness of an image signal output from the imaging unit when the second aperture value is set become approximately equal to each other.

According to a third aspect of the invention, an imaging apparatus includes an imaging unit including an image sensor configured to photoelectrically convert an object image to accumulate electric charge, a display unit configured to display an image signal output from the imaging unit, a diaphragm control unit configured to control an aperture value of a diaphragm configured to adjust an amount of light incident on the image sensor, and an electronic shutter control unit configured to control an operation of an electronic shutter for adjusting a charge accumulation time of the image sensor by adjusting a driving timing of the image sensor, wherein, when a live view operation for causing the image sensor to sequentially accumulate electric charge and causing the display unit to display an image signal sequentially output from the imaging unit is performed and if driving of the diaphragm overlaps a charge accumulation time when the aperture value is changed from a first aperture value to a second aperture value, the electronic shutter control unit controls a time of charge accumulation corresponding to the second aperture value in the charge accumulation time such that a brightness of an image signal output from the imaging unit when the first aperture value is set and a brightness of an image signal output from the imaging unit when the second aperture value is set become approximately equal to each other.

According to a fourth aspect of the invention, an imaging apparatus includes an imaging unit including an image sensor configured to photoelectrically convert an object image to accumulate electric charge, a display unit configured to display an image signal output from the imaging unit, a diaphragm control unit configured to control an aperture value of a diaphragm configured to adjust an amount of light incident on the image sensor, an electronic shutter control unit configured to control an operation of an electronic shutter for adjusting a charge accumulation time of the image sensor by adjusting a driving timing of the image sensor, and a gain control unit configured to control a gain of the image signal, wherein, when a live view operation for causing the image sensor to sequentially accumulate electric charge and causing the display unit to display an image signal sequentially output from the imaging unit is performed and if driving of the diaphragm overlaps a charge accumulation time when the aperture value is changed from a first aperture value to a second aperture value, the gain control unit controls a gain corresponding to the second aperture value in the charge accumulation time such that a brightness of an image signal output from the imaging unit when the first aperture value is set and a brightness of an image signal output from the imaging unit when the second aperture value is set become approximately equal to each other.

According to a fifth aspect of the invention, a method is provided for controlling an imaging apparatus including an imaging unit including an image sensor configured to photoelectrically convert an object image to accumulate electric charge, a diaphragm control unit configured to control an aperture value of a diaphragm configured to adjust an amount of light incident on the image sensor, and an electronic shutter control unit configured to control an operation of an electronic shutter for adjusting a charge accumulation time of the image sensor by adjusting a driving timing of the image sensor. The method includes, if driving of the diaphragm overlaps a charge accumulation time when the aperture value is changed from a first aperture value to a second aperture value, controlling a time of charge accumulation corresponding to the second aperture value in the charge accumulation time such that a brightness of an image signal output from the imaging unit when the first aperture value is set and a brightness of an image signal output from the imaging unit when the second aperture value is set become approximately equal to each other.

According to a sixth aspect of the invention, a method is provided for controlling an imaging apparatus including an imaging unit including an image sensor configured to photoelectrically convert an object image to accumulate electric charge, a diaphragm control unit configured to control an aperture value of a diaphragm configured to adjust an amount of light incident on the image sensor, an electronic shutter control unit configured to control an operation of an electronic shutter for adjusting a charge accumulation time of the image sensor by adjusting a driving timing of the image sensor, and a gain control unit configured to control a gain of an image signal output from the imaging unit. The method includes, if driving of the diaphragm overlaps a charge accumulation time when the aperture value is changed from a first aperture value to a second aperture value, controlling a gain corresponding to the second aperture value in the charge accumulation time such that a brightness of an image signal output from the imaging unit when the first aperture value is set and a brightness of an image signal output from the imaging unit when the second aperture value is set become approximately equal to each other.

According to a seventh aspect, a method is provided for controlling an imaging apparatus including an imaging unit including an image sensor configured to photoelectrically convert an object image to accumulate electric charge, a display unit configured to display an image signal output from the imaging unit, a diaphragm control unit configured to control an aperture value of a diaphragm configured to adjust an amount of light incident on the image sensor, and an electronic shutter control unit configured to control an operation of an electronic shutter for adjusting a charge accumulation time of the image sensor by adjusting a driving timing of the image sensor. The method includes, when a live view operation for causing the image sensor to sequentially accumulate electric charge and causing the display unit to display an image signal sequentially output from the imaging unit is performed and if driving of the diaphragm overlaps a charge accumulation time when the aperture value is changed from a first aperture value to a second aperture value, controlling a time of charge accumulation corresponding to the second aperture value in the charge accumulation time such that a brightness of an image signal output from the imaging unit when the first aperture value is set and a brightness of an image signal output from the imaging unit when the second aperture value is set become approximately equal to each other.

According to an eighth aspect of the invention, a method is provided for controlling an imaging apparatus including an imaging unit including an image sensor configured to photoelectrically convert an object image to accumulate electric charge, a display unit configured to display an image signal output from the imaging unit, a diaphragm control unit configured to control an aperture value of a diaphragm configured to adjust an amount of light incident on the image sensor, an electronic shutter control unit configured to control an operation of an electronic shutter for adjusting a charge accumulation time of the image sensor by adjusting a driving timing of the image sensor, and a gain control unit configured to control a gain of the image signal. The method includes, when a live view operation for causing the image sensor to sequentially accumulate electric charge and causing the display unit to display an image signal sequentially output from the imaging unit is performed and if driving of the diaphragm overlaps a charge accumulation time when the aperture value is changed from a first aperture value to a second aperture value, controlling a gain corresponding to the second aperture value in the charge accumulation time such that a brightness of an image signal output from the imaging unit when the first aperture value is set and a brightness of an image signal output from the imaging unit when the second aperture value is set become approximately equal to each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a sequence diagram illustrating a sequence of operation when a release button of the digital camera is pressed according to an exemplary embodiment of the invention.

FIG. 12 is a timing chart illustrating operations of the digital camera upon exposure control according to an exemplary embodiment of the invention.

DETAILED DESCRIPTION OF THE EMBODIMENTS

Various exemplary embodiments, features and aspects of the invention will be described in detail below with reference to the drawings.

First Exemplary Embodiment

Figure 1:
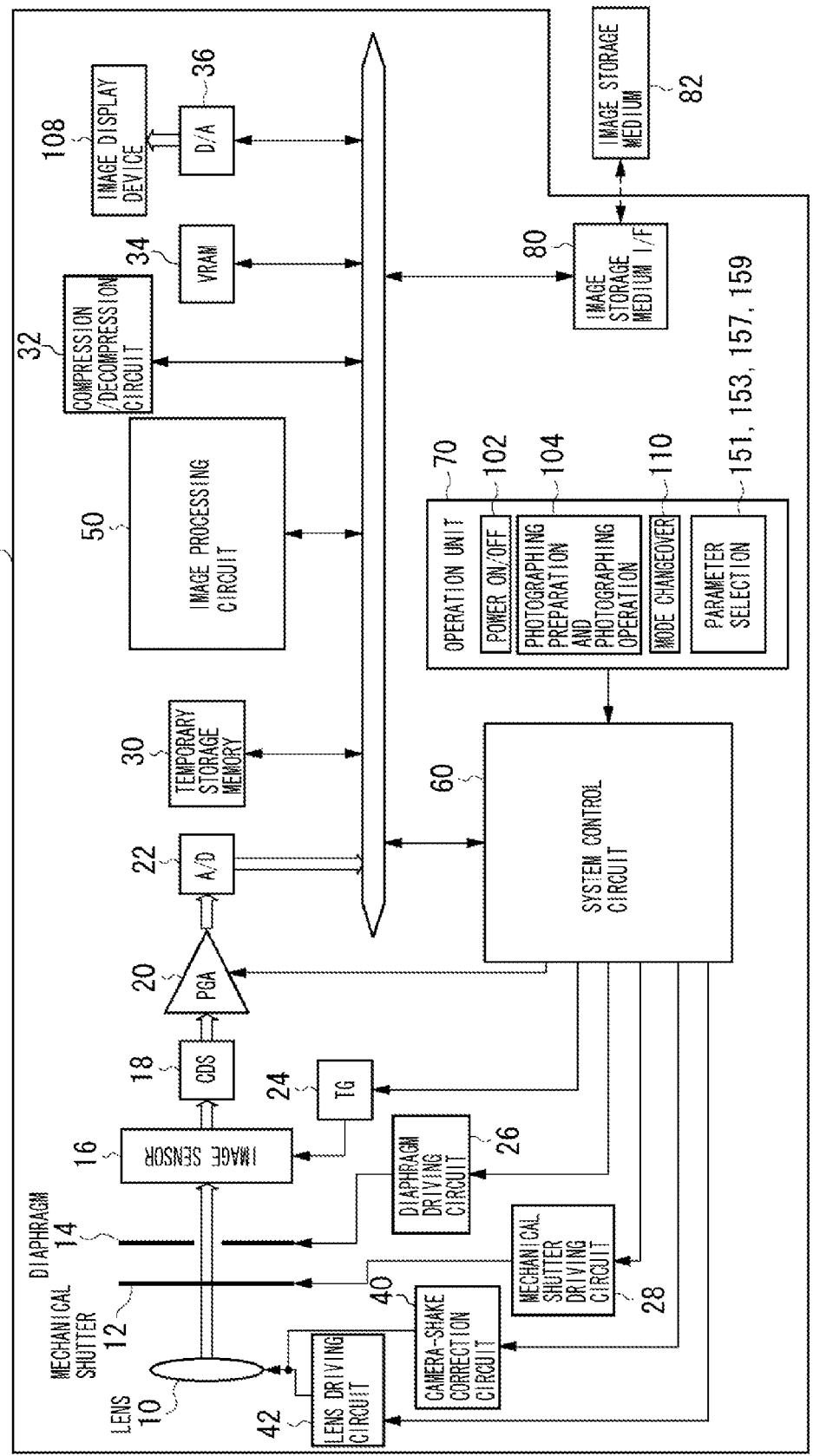
FIG. 1 is a block diagram illustrating a system configuration of an example digital camera serving as an imaging apparatus according to an exemplary embodiment of the invention.

FIG. 1 is a block diagram illustrating a system configuration of an example digital camera serving as an imaging apparatus according to an exemplary embodiment of the invention.

A digital camera 100 includes a lens 10 for forming an object image. In FIG. 1, the digital camera 100 has only one lens 10. However, the digital camera 100 can include a lens unit including a plurality of lenses. Also, the digital camera 100 can adjust a focus or an angle of field by moving the position of the lens 10 in forward and backward directions along a photographing optical axis by a lens driving circuit 42. The digital camera 100, further, can drive the lens 10 by a camera-shake correction circuit 40 to move the optical axis in a direction to cancel a camera-shake, thus performing an optical camera-shake correction. In FIG. 1, the camera-shake correction is achieved by driving the lens 10. However, an image sensor 16 (charge-coupled device (CCD) in the present exemplary embodiment) can be moved to correct a camera-shake. The digital camera 100 can employ such a configuration that a lens barrel unit including the lens 10 can be extended and retracted, so that a main body volume thereof when it is not used can be made smaller, thus improving portability. An amount of light having passed through the lens 10 can be adjusted by a diaphragm 14.

A system control circuit 60 can control an opening amount of the diaphragm 14 by transmitting diaphragm control information to a diaphragm driving circuit 26. Transmission of the control information from the system control circuit 60 to the diaphragm driving circuit 26 can be performed by any method suitable for a specification of the diaphragm driving circuit 26, for example, a serial communication method, a pulse signal method, and so on. Examples of the diaphragm 14 include an iris diaphragm including a plurality of blades and a perforated diaphragm formed such that holes of various diameters are defined in a plate. The system control circuit 60 controls the diaphragms 14 and the diaphragm driving circuit 26 to reduce the aperture of the diaphragm 14 to lower the amount of light if an object luminance value is high and to open the aperture of the diaphragm 14 to receive a more amount of light if the object luminance value is low.

The system control circuit 60 can control a mechanical shutter 12 by transmitting control information for the mechanical shutter 12 to a mechanical shutter driving circuit 28. An exposure time for photographing a still image is determined by an opening and closing time of the mechanical shutter 12. The system control circuit 60 determines the exposure time and sends a command to the mechanical shutter driving circuit 28.

Light having passed through the lens 10, the mechanical shutter 12, and the diaphragm 14 is received by the image sensor 16. The system control circuit 60 transmits an image sensor control signal to a timing generator (TG) 24 to control the image sensor 16. Transmission of the control information from the system control circuit 60 to the TG 24 can be performed by any suitable method according to a specification of the TG 24, for example, a serial communication method and a parallel bus communication method. The TG 24 drives the image sensor 16 based on the control information received from the system control circuit 60. The image sensor 16 periodically performs an exposure operation and a readout operation for an image signal based on a driving signal from the TG 24. Specific lines or a specific area in the image signal can be read out by the image sensor 16. This can be achieved by changing a reading method according to a reading control pulse output from the TG 24. The system control circuit 60 determines a suitable reading method depending on the situation to send a command to the TG 24. For example, the system control circuit 60 can read out signals of all pixels of the image sensor 16 when a high resolution is required for photographing a still image. Also, the system control circuit 60 can read out only signals of specific lines when a high frame rate of, for example, a 30 frames per second (fps)/60 fps is required upon an electronic viewfinder operation or upon a moving image photographing operation.

Also, the TG 24 can control the exposure time of the image sensor 16 by transmitting a driving signal to the image sensor 16 at specified timing to cause the image sensor 16 to release electric charge.

The image signal read from the image sensor 16 passes through a correlated double sampling (CDS) circuit 18. The CDS circuit 18 mainly serves to eliminate a noise component of the image signal according to a correlated double sampling method.

Then, the image signal can be attenuated/amplified in image signal level by a programmable gain amplifier (PGA) 20. The system control circuit 60 can control an amount of amplification of the image signal by transmitting an amplification level to the PGA 20. Transmission of control information from the system control circuit 60 to the PGA 20 can be performed by any suitable method depending on a specification of the PGA 20, for example, a serial communication method and a parallel bus communication. Generally, in order to place the exposure of the image sensor 16 in an appropriate level, the amount of exposure to the image sensor 16 is set by the diaphragm 14 to an appropriate level as well as an exposure time is set by the shutter 12 to an appropriate level. However, if the image signal is attenuated/amplified by the PGA 20, a pseudo change of the exposure of the image signal can be performed. This function can be provided to a user in the sense of sensitivity as one of exposure conditions upon photographing in addition to an aperture value and a shutter speed.

The image signal is converted from an analog signal to a digital signal by an analog/digital (A/D) conversion circuit 22. A bit width of the digital signal, including 10 bits, 12 bits, and 14 bits, varies depending on a device, and an image processing circuit 50, which follows the A/D conversion circuit 22, is compatible with a plurality of bit widths. The CDS circuit 18, the PGA 20, and the A/D conversion circuit 22 are illustrated independently in FIG. 1. However, functions of those can be packed in one IC package.

The image data having converted into digital data by the A/D conversion circuit 22 is input to the image processing circuit 50. The image processing circuit 50 includes a plurality of blocks to provide various functions.

The image sensor 16 is typically configured to extract a specific color component for each of the pixels through a color filter. The image data from the A/D conversion circuit 22 is in the form of data corresponding to an arrangement of pixels and a color filter array of the image sensor 16. Therefore, the image data from the A/D conversion circuit 2 is not suitable to be used in auto exposure (AE) control, in which exposure control is performed by evaluating only a luminance component. The image processing circuit 50 includes a function of extracting only luminance information from the image signal while excluding color information. Further, the image processing circuit 50 has a function of extracting only a frequency component of the signal read from the image sensor 16 and, therefore, can use the frequency component for auto focus (AF) control. Also, the image processing circuit 50 has a function of controlling an increase/decrease of the level of the image data digitized by the A/D conversion circuit 22 and a color effect of the image data to adjust an image quality of a photographed image.

The image data digitized by the A/D conversion circuit 22 is input to the image processing circuit 50 and, at the same time, can be stored in a temporary storage memory 30. The image data temporarily stored in the temporary storage memory 30 can be read out therefrom. Thus, the image data can be retrieved by the system control circuit 60 and the read image data can be input to the image processing circuit 50. Further, the image data having been processed by the image processing circuit 50 can be rewritten in the temporary storage memory 30 and arbitrary data can be written in the temporary storage memory 30 via the system control circuit 60.

When image data is output to an image display device 108, such as an LCD, the image data having been processed by the image processing circuit 50 is once rasterized on a video random access memory (VRAM) 34 and converted into an analog signal by a D/A conversion circuit 36, which is displayed on the image display device 108. As for an electronic viewfinder, a series of image data read from the image sensor 16 is sequentially displayed and updated on the image display device 108. In the electronic viewfinder, only one frame or a plurality of frames of image data in the VRAM 34 can be prevented from being updated on the image display device 108. This method can be used to prevent a deteriorated image caused when the diaphragm 14 is driven (when the diaphragm 14 is moving) from being output to the image display device 108. The image data can be rasterized on the VRAM 34 in such various manners that one image data becomes the largest size on the image display device 108 or a plurality of images are displayed on the image display device 108 in the form of a multi-image display.

Not only an image but also optional information, alone or in combination, can be displayed on the image display device 108. A camera status, character information, such as a shutter speed, an aperture value, and sensitivity information, selected by the user or determined by the digital camera 100, and a graph illustrating a luminance distribution measured by the image processing circuit 50 can also be displayed on the image display device 108. A display position of the information and color thereof are also selectable. Display of these various types of information on the image display device 108 enables a user interface to be realized. The image display device 108 also can display image data stored in an image storage medium 82 via an image storage medium interface (I/F) 80. Compressed image data is decompressed by a compression/decompression circuit 32 and is then rasterized on the VRAM 34. This data is converted into an analog signal by the D/A conversion circuit 34, which is then output to the image display device 108.

Figure 2B:
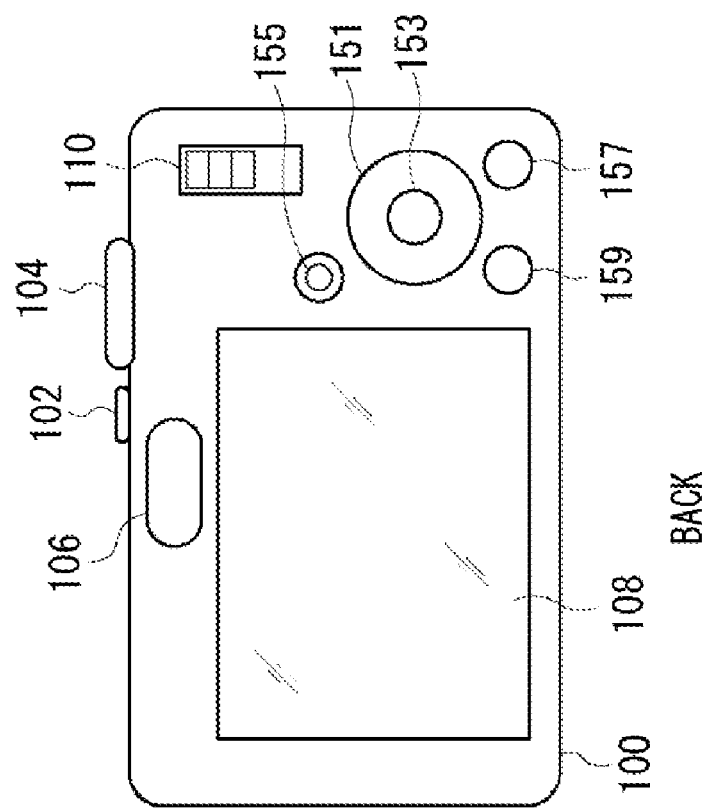
FIGS. 2A and 2B illustrate appearances of the digital camera according to an exemplary embodiment of the invention.
Figure 2A:
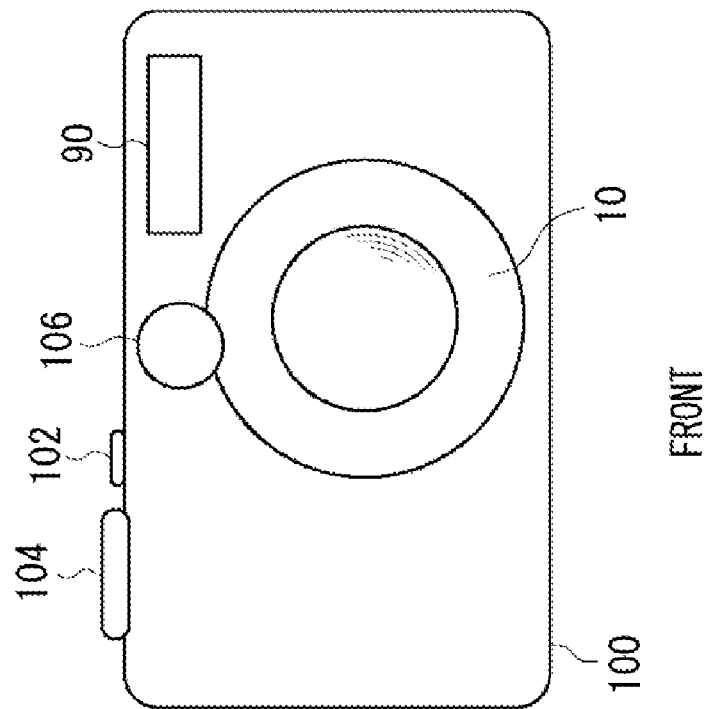

FIGS. 2A and 2B illustrate appearances of the digital camera 100. A front surface of the digital camera 100 is provided with the lens 10 for capturing an object image. The front surface of the digital camera 100 is also provided with a flash unit 90. If a main object is dark, the flash unit 90 can emit light to obtain a sufficient amount of light, thus enabling keeping a high shutter speed in the dark circumstance to obtain an appropriate image. In FIG. 2A, the lens 10 and the flash unit 90 are located on the same surface of the digital camera 100. However, the arrangement thereof is not necessarily limited to this. The flash unit 90 can be arranged to be oriented upward of the camera 100 to prevent flash from the flash unit 90 from falling directly on a main object.

A back surface of the digital camera 100 is provided with the image display device 108. As described above, the image display device 108 can display not only an image but also character information, a graph, and the like, thus serving as a material member for generating an interface with the user. Recently, a digital camera with an electronic viewfinder (EVF) has become mainstream. The user can view serial images output to the image display device 108 to capture an object, thus using the image display device 108 as an electronic viewfinder. The digital camera 100 can include an optical viewfinder 106 in addition to the electronic viewfinder. The electronic viewfinder has such advantages that a high field coverage can be obtained with ease, an object can be viewed in a good condition as the image display device 108 becomes larger, and there is no parallax between a photographed image and a viewfinder image. On the other hand, electric power is required for actuating the image sensor 16 and the image display device 108, such that a battery drain is a concern. Therefore, if the user wishes to take many photographs while avoiding a battery drain, the user can select such a use method to turn off the electric viewfinder and to use the optical viewfinder 106 instead.

A mode changeover switch 110 can switch between camera operation modes, such as a still image photographing mode, a moving image photographing mode, and a play-back mode. In FIG. 2B, the mode changeover switch 110 is illustrated as a member capable of switching between several modes. However, the mode changeover switch 110 can also include many still image modes suitable for specific scenes to be shot, such as a landscape photographing mode an a portrait photographing mode.

Parameter selection switches 151, 153, 155, 157, and 159 enable the user to select photographic conditions upon photographing an object, a page advancing operation upon playback of the photographed images, a general setting for camera operations, and the like. The user also can select ON/OFF for the above-described electronic viewfinder. The image display device 108 can have such a configuration as to display an image thereon and to serve as an input device, such as a touch panel.

The digital camera 100 includes a release button 104 on its top portion. The release button 104 is one of operation members, which enables a two-stage pressing operation, namely, a stage that the user half-presses the release button 104 (SW1 operation) and a stage that the user full-presses the release button 104 (SW2 operation). In the case of a camera capable of performing auto-exposure control and auto-focus control, the auto-exposure control and the focus control can be performed as a photographing preparation operation by half-pressing the release button 104, and a still image can be photographed by fully pressing the release button 104.

The auto-exposure control operates to obtain a suitable exposure at the photographing mode selected with the mode changeover switch 110. The photographing mode includes modes that are specialized for a specific object, such as a portrait mode, a landscape mode, and a night scene mode, and a general mode, such as an auto mode. Also, the photographing mode includes a shutter speed priority mode and an aperture priority mode, in which the user preliminarily determines a shutter speed and an aperture value upon photographing an object. In these modes, an appropriate photographing sensitivity to be set by the PGA 20 can be automatically selected and the user can preliminarily specify the sensitivity. When the user preliminarily specifies the sensitivity, the user, who wishes to prioritize an image quality, can select a low sensitivity since a signal-to-noise (S/N) ratio of an image signal lowers as the photographing sensitivity increases.

Figure 4:
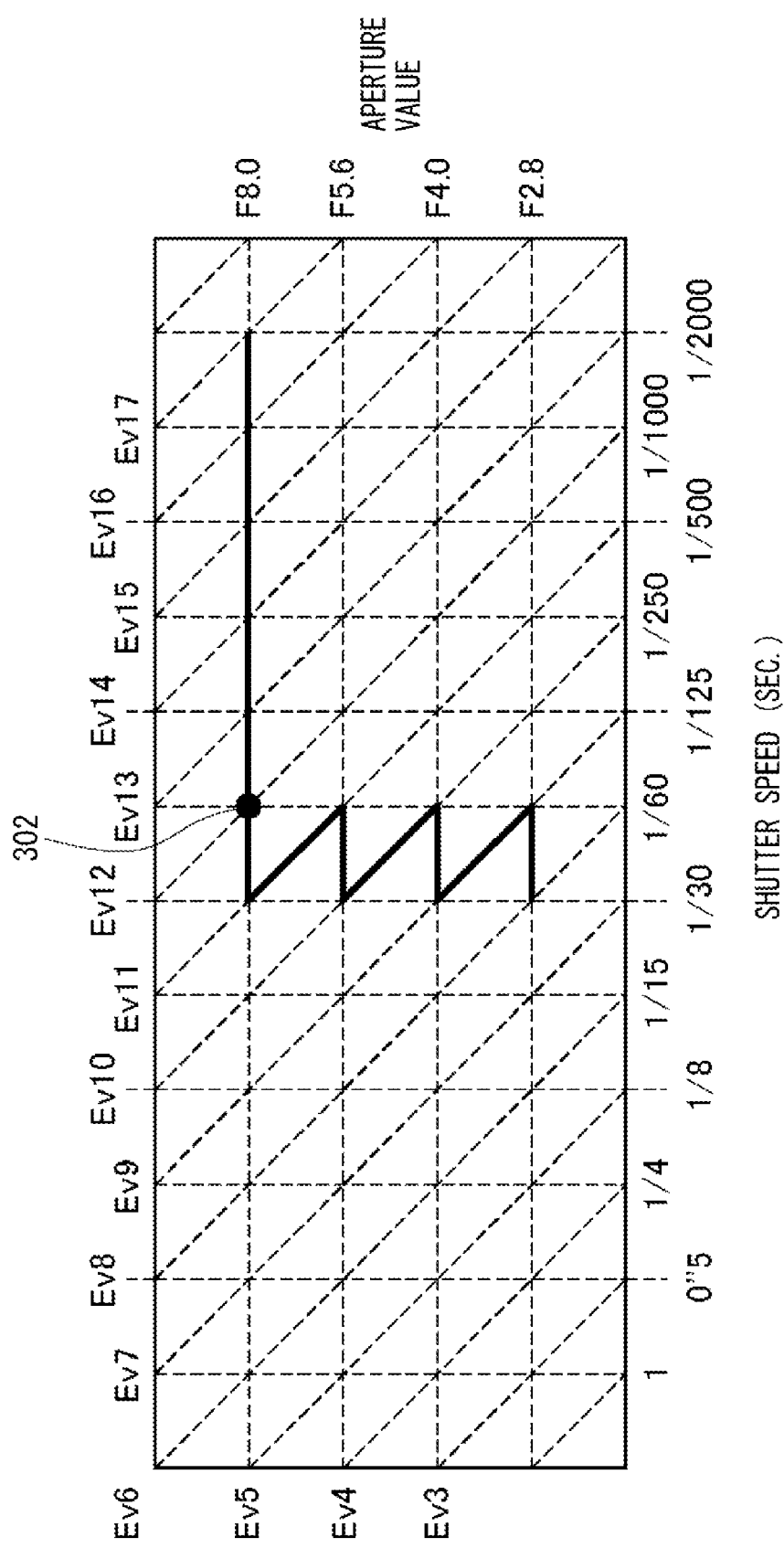
FIG. 4 is an electronic viewfinder (EVF) diagram among program diagrams to be used in each of the camera operations of the digital camera according to an exemplary embodiment of the invention.
Figure 5:
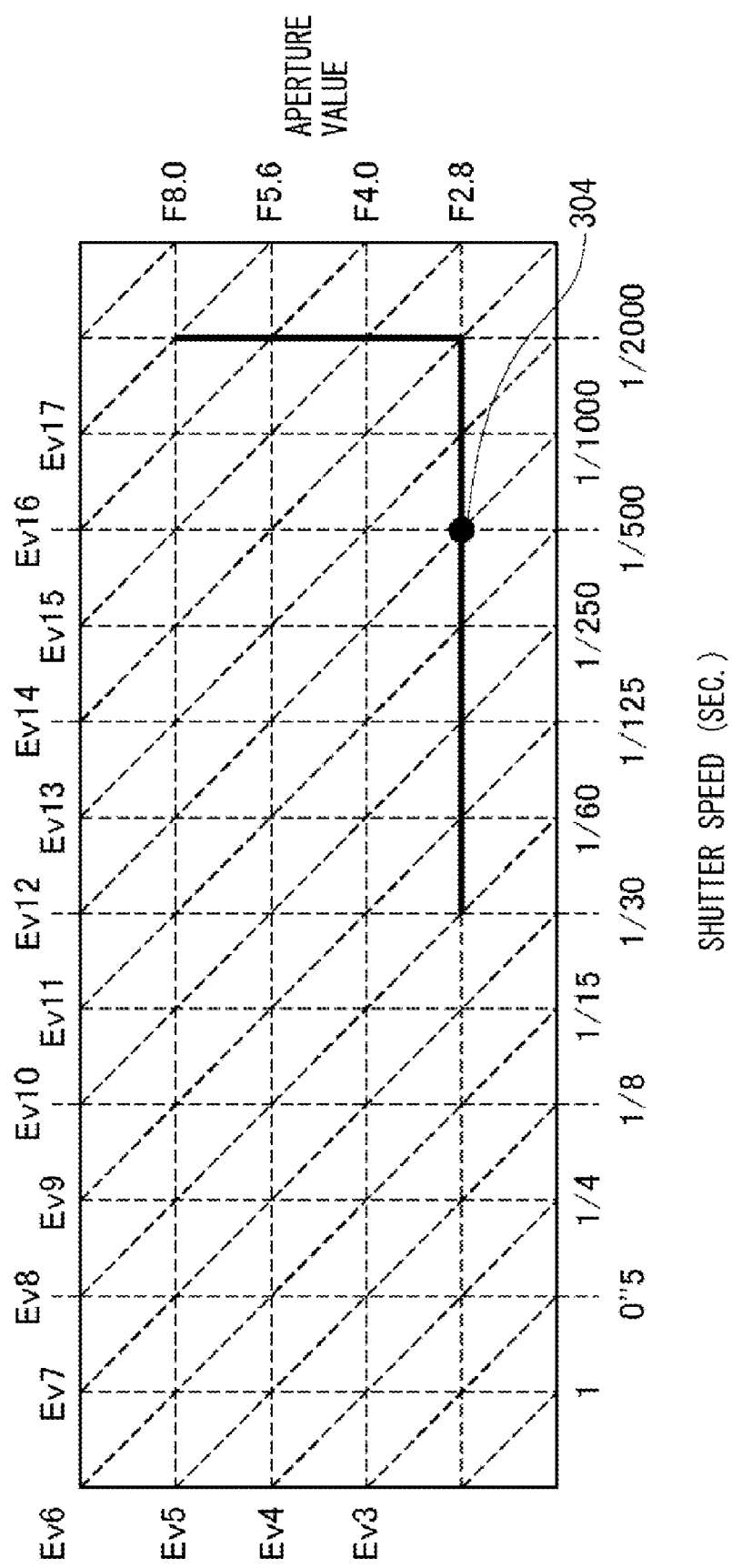
FIG. 5 is an AF control diagram among the program diagrams to be used in each of the camera operations of the digital camera according to an exemplary embodiment of the invention.
Figure 6:
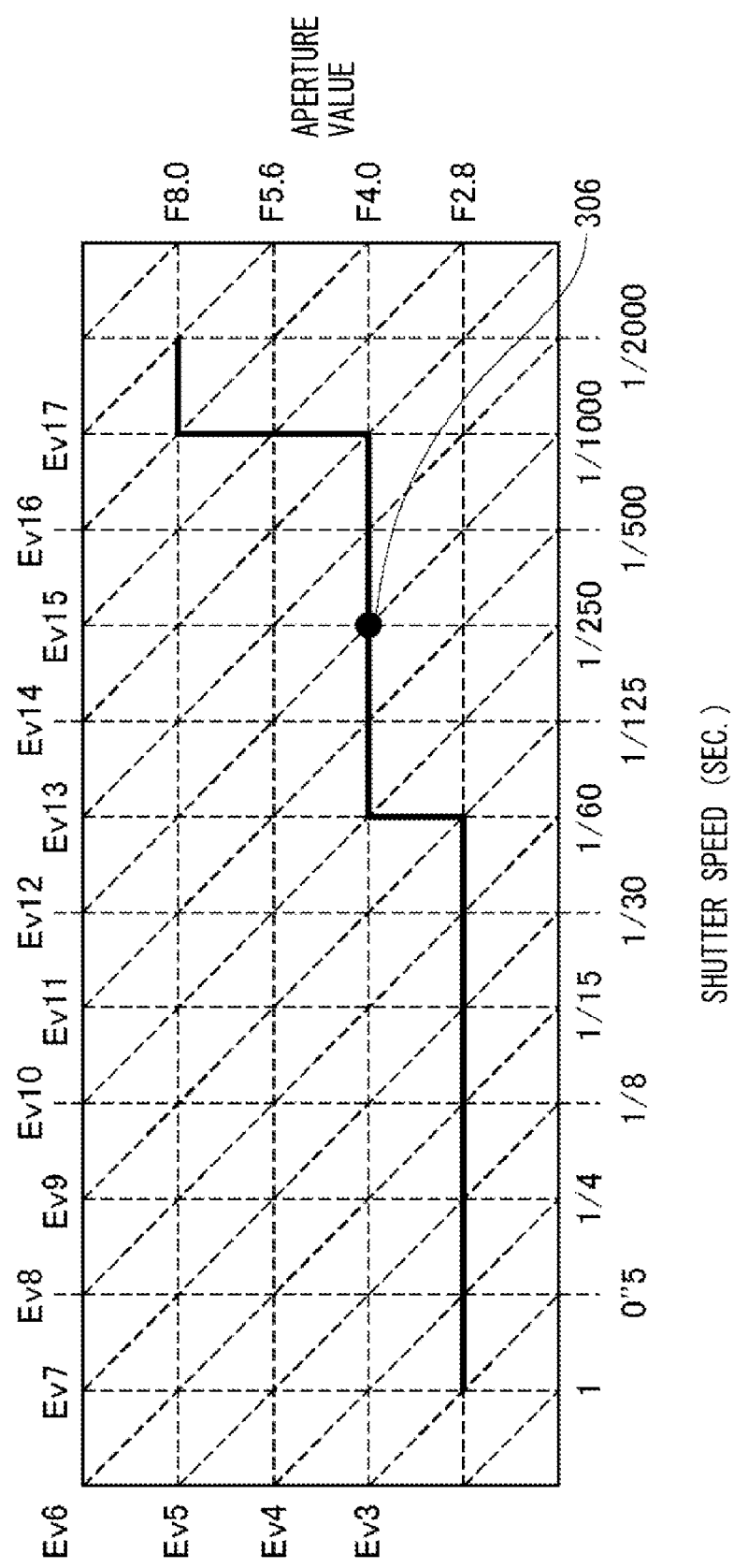
FIG. 6 is a still image diagram among the program diagrams to be used in each of the camera operations of the digital camera according to an exemplary embodiment of the invention.

FIG. 3 illustrates a sequence of operation when the release button 104 is pressed. In FIG. 3, operations of the digital camera 100 and changes of the aperture diameters of the diaphragm 14 according to the operations of the digital camera 100 are mainly illustrated. FIG. 4 illustrates an EVF diagram, FIG. 5 illustrates an AF control diagram, and FIG. 6 illustrates a still image diagram, among program diagrams to be used for each of the camera operations. The program diagram is a type of table information defining a combination of an aperture value, a shutter speed, and a gain, which can be selected upon a certain operation of the digital camera 100. An exposure value is determined using the program diagram according to an object luminance. The contents of the program diagrams described above are only examples, and the contents of the program diagrams can be optionally changed according to individual devices.

A live view operation (EVF) state 212 among the camera operation states is a state that object images are serially output to the image display device 108, which is serving as an electronic viewfinder, and thus is a photographing standby state before photographing an object. In the EVF state 212, exposure control values for an aperture value, a shutter speed, and so on are calculated using the EVF program diagram illustrated in FIG. 4, and the aperture value, the shutter speed, and so on are controlled to have the calculated exposure control values. When a CCD is used as the image sensor 16, a program diagram is set to the one for early controlling the aperture diameter of the diaphragm 14 toward a reduced aperture in order to decrease a smear phenomenon unique to the CCD. In FIG. 4, the diagram represents discrete diaphragm control, which takes only four aperture values of F2.8, F4.0, F5.6, and F8.0. The reason is as follows. There is a case that a certain range of diaphragm driving speed is required to realize high diaphragm control accuracy. However, a driving noise may occur if the diaphragm is driven at high driving speed. Consequently, there is such a case where a program diagram formed into a piled reverse-Z shape is designed as illustrated in FIG. 4 to limit the number of occurrences of the driving noise when AE control follows changes of an object luminance. However, this case depends on an accuracy of the mechanical structure of a diaphragm, and thus it is not required to make the program diagram as illustrated in FIG. 4 if the diaphragm has such a mechanical structure that a driving noise can be reduced owing to low-speed driving as well as a high accuracy can be realized. In other words, a linear diagram in a vertical direction between F2.8 and F8.0 can be designed.

When the user half-presses the release button 104 (state 202) to place it in an SW1 state from the live view operation (EVF) state 212, the digital camera 100 is switched to an auto-focus (AF) state 214. When the image sensor 16, such as the CCD, is used as a range-finding sensor for AF control, the following AF control method can be employed. A scan AF control method can be used in which the lens 10 is moved along a photographing optical axis and, at each lens position, a frequency component of an image is extracted by the image processing circuit 50 based on an image signal read from the image sensor 16 to seek a lens position with a high frequency. A program diagram to be used in this AF scan is designed such that the aperture diameter of the diaphragm stay in the full-aperture position as illustrated in FIG. 5. This is because of considering such an optical phenomenon that the depth of field changes according to the aperture diameter of the diaphragm. In other words, if a focus position is adjusted to a shallow depth of field, changes of the depth of field would less adversely affect the focus position irrespective of the aperture diameter of the diaphragm upon photographing an object after AF control. If the focus position is adjusted in a state of a deep depth of field upon AF scan and then a still image is photographed with an opened aperture diameter of the diaphragm, there is such a concern that a focal shift may occur because the depth of field becomes shallower due to an increase of the aperture diameter of the diaphragm. On the other hand, if the aperture diameter of the diaphragm to be used upon photographing a still image has already been determined, such a sequence can be employed that a scan AF is performed not using a program diagram illustrated in FIG. 5 but using the aperture diameter of the diaphragm determined for photographing a still image upon AF control.

After completion of the AF control, the release button 104 comes into an SW1 keeping state 216. The SW1 keeping state is provided to determine a focus and an exposure for photographing a still image (state 218) and is a state allowing immediate photographing when the release button 104 is further pressed to place it in the SW2 state (state 204). FIG. 3 illustrates a sequence in which the release button 104 is pressed to preliminarily set the aperture diameter of the diaphragm 14 to be used in photographing a still image after the AF control for the purpose of shortening a photographing time lag after pressing the release button 104 to place it in the SW2 state. With the above configuration, the user can capture a still image any moment desired since the diaphragm 14 does not move after the release button 104 is pressed to place it in the SW2 state.

If a photographing sequence in which the camera operations are changed in the above manner is realized, there is a plurality of timings at which the diaphragm 14 is driven. At one timing, the program diagram is changed from a state of FIG. 4 to a state of FIG. 5 when the camera operation is changed from the EVF state to the AF control state to drive the diaphragm 14. At the other timing, the camera operation is changed from the AF control state to the SW1 keeping state. For example, the changes of the aperture value and the shutter speed, where the exposure value of EV=12 is kept, are expressed by the following formulas. In this example, the value of the sensitivity Sv is assumed common to the EVF diagram of FIG. 4, the AF control diagram of FIG. 5, and the still image diagram of FIG. 6.

EVF diagram: F8.0, 1/60 sec. (302)

AF control diagram: F2.8, 1/500 sec. (304)

still image diagram: F4.0, 1/250 sec. (306)

As described above, the aperture value and the shutter speed change while the exposure value of Ev=12 is kept depending on the camera operations. However, the diaphragm 14 requires a certain time period to be driven since the diaphragm 14 has a mechanical structure. During this driving state of the diaphragm 14, the image sensor 16 receives object light, resulting in that an image quality deterioration state due to driving of the diaphragm 14 is output to the image display device 108, which is used as a viewfinder. When the release button 104 is pressed, the user would like to concentrate on photographing a desired image. However, the user sometimes looses his concentration or, at worst, may loose an opportunity to capture an object since the image quality deterioration by the exposure variation due to driving of the diaphragm 14 is seen in the viewfinder.

Figure 7:
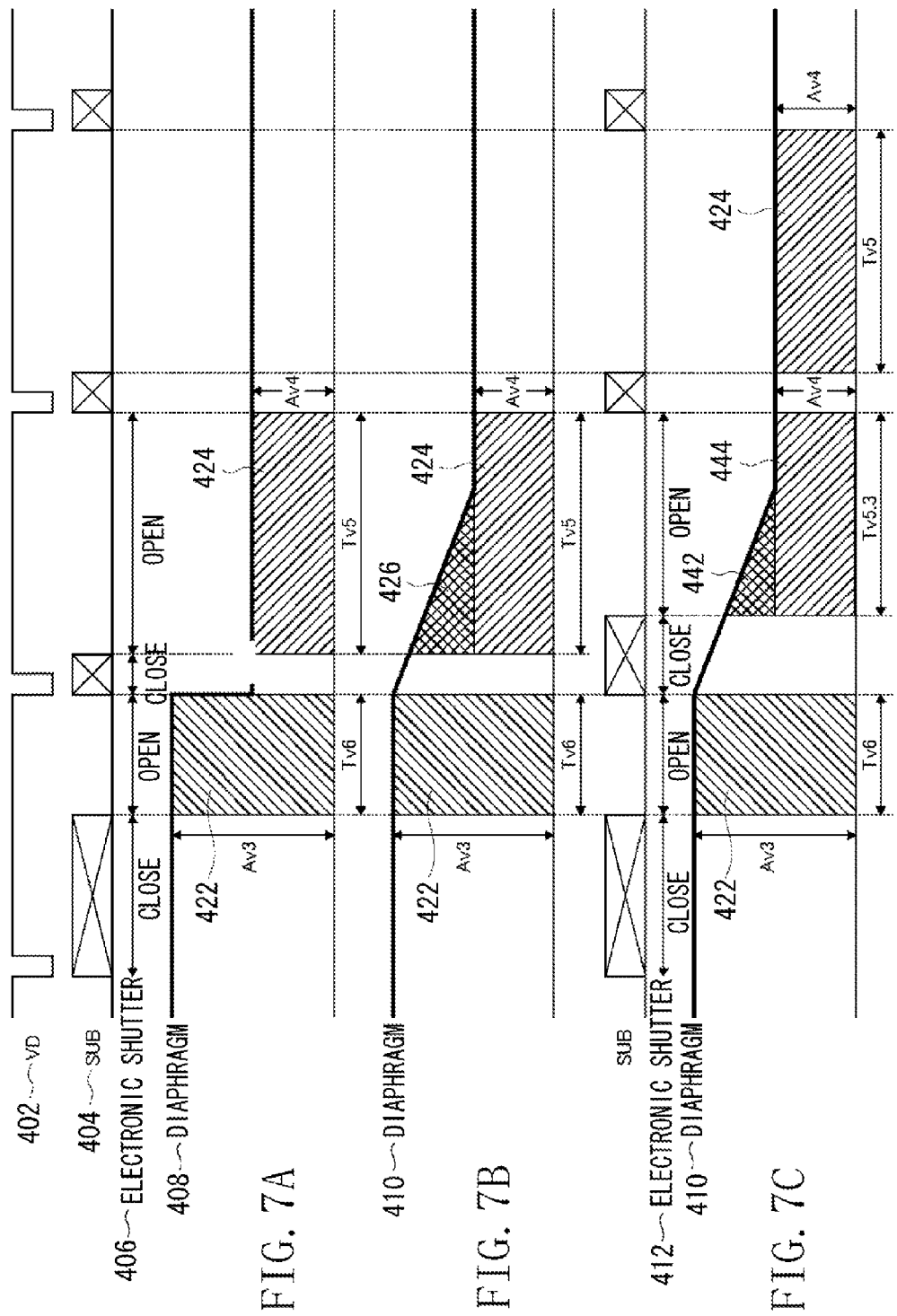
FIGS. 7A through 7C are detailed timing diagrams illustrating image quality deterioration due to an exposure variation caused upon driving a diaphragm in the digital camera according to an exemplary embodiment of the invention.

FIGS. 7A through 7C are timing diagrams illustrating the image quality deterioration due to the exposure variation caused by driving of the diaphragm 14. FIGS. 7A through 7C exemplify a case where an exposure is changed from Av3 (F2.8) and Tv6 (1/60 sec.) to Av4 (F4.0) and Tv5 (1/30 sec.). This exposure change is expressed by the following formula.

exposure before control: Av3+Tv6=Ev9 (422)

exposure after control: Av4+Tv5=Ev9 (424)

In other words, the aperture value and the shutter speed change while the state of Ev=9 is kept.

A vertical synchronizing signal (VD) 402 is supplied to the image sensor 16. An output amount of an SUB pulse 404 is adjusted within a range of the vertical synchronizing signal (VD) 402, thereby controlling the driving timing of the image sensor 16 to realize opening/closing of an electronic shutter 406 (control of a charge accumulation time, namely, electronic shutter control). The SUB pulse 404 serves to discharge electric charge accumulated in the image sensor 16 and to disable exposure by releasing the electric charge. Namely, the SUB pulse 404 is considered as closing a shutter. Electric charge is continued to be accumulated while the SUB pulse is not output, which is considered to be in a shutter opening state (electronic shutter opening time). As described above, the SUB pulse 404 realizes opening/closing of the electronic shutter.

FIG. 7A is a timing diagram illustrating a case where a diaphragm driving time is zero when an exposure is changed from Av3 and Tv6 to Av4 and Tv5. An output amount of the SUB pulse 404 can be controlled in synchronization with the VD 402, such that an electronic shutter speed can be changed immediately between a VD and a subsequent VD. In a case where the diaphragm 14 also can be changed instantaneously for each VD, the diaphragm 14 can move from Av3 to Av4 without any time lag as illustrated with driving 408 of the diaphragm 14. In this case, an amount of exposure 422 at Av3 and Tv6 and an amount of exposure 424 at Av4 and Tv5 are equal to each other in view of the amount of exposure (an area of a shaded portion and also an amount of accumulated electric charge). Thus, the diaphragm 14 and the electronic shutter can be controlled while the exposure value Ev=9 is kept.

However, since a certain time period is actually required for driving the diaphragm 14, a practical time lag occurs during driving 410 of the diaphragm 14 as illustrated in FIG. 7B. At this time, an excessive exposure 426 occurs due to driving of the diaphragm 14. This excessive exposure 426 may be displayed on the viewfinder as an exposure variation.

In view of the above, the present exemplary embodiment is directed to keeping the exposure value Ev without changing the amount of exposure (area of a shaded portion) even when the diaphragm 14 is being driven, as illustrated in FIG. 7C. More specifically, in order to prevent or reduce a change of the amount of exposure, the shutter speed 412 is corrected from an original target value of Tv=5 to a slightly faster shutter speed (Tv5.3) to allow an excessive exposure 442 to be balanced out by an amount of exposure 444. Subsequently, after driving of the diaphragm is completed, the shutter speed is set to the original target value of Tv=5. With the above-described control, an image quality deterioration due to an exposure variation caused by driving of the diaphragm 14 can be prevented from being displayed on the viewfinder.

Figure 8:
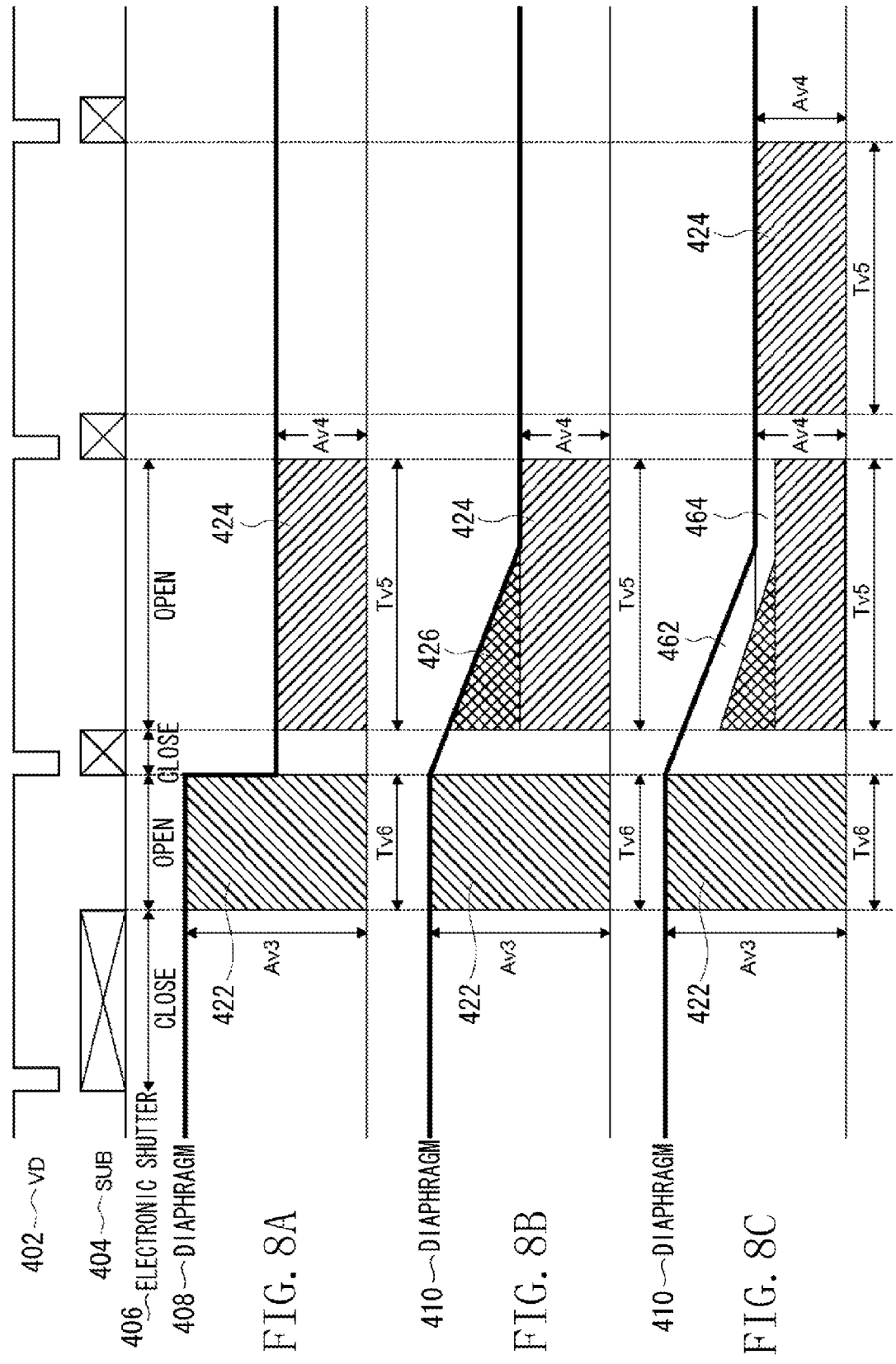
FIGS. 8A through 8C are detailed timing diagrams illustrating image quality deterioration due to an exposure variation caused upon driving the diaphragm in the digital camera according to an exemplary embodiment of the invention.

The variation of the amount of exposure caused by driving of the diaphragm 14 can be corrected using a gain in addition to using the shutter. FIG. 8C illustrates a case where the amount of exposure variation caused by driving of the diaphragm 14 is reduced using a gain. Amplification/attenuation of the image signal using the gain can affect all of the signals read from the image sensor 16. Therefore, as illustrated in FIG. 8C, levels of the amount of exposures 426 and 424 are generally lowered as indicated by 462 and 464, such that the amount of exposure does not change at photographed signal levels read from the image sensor 16. Accordingly, an effect similar to that obtained when the amount of exposure is corrected using the electronic shutter can be obtained. Thus, an image quality deterioration due to an exposure variation caused by driving of the diaphragm 14 can be prevented from being displayed on the viewfinder.

Figure 9:
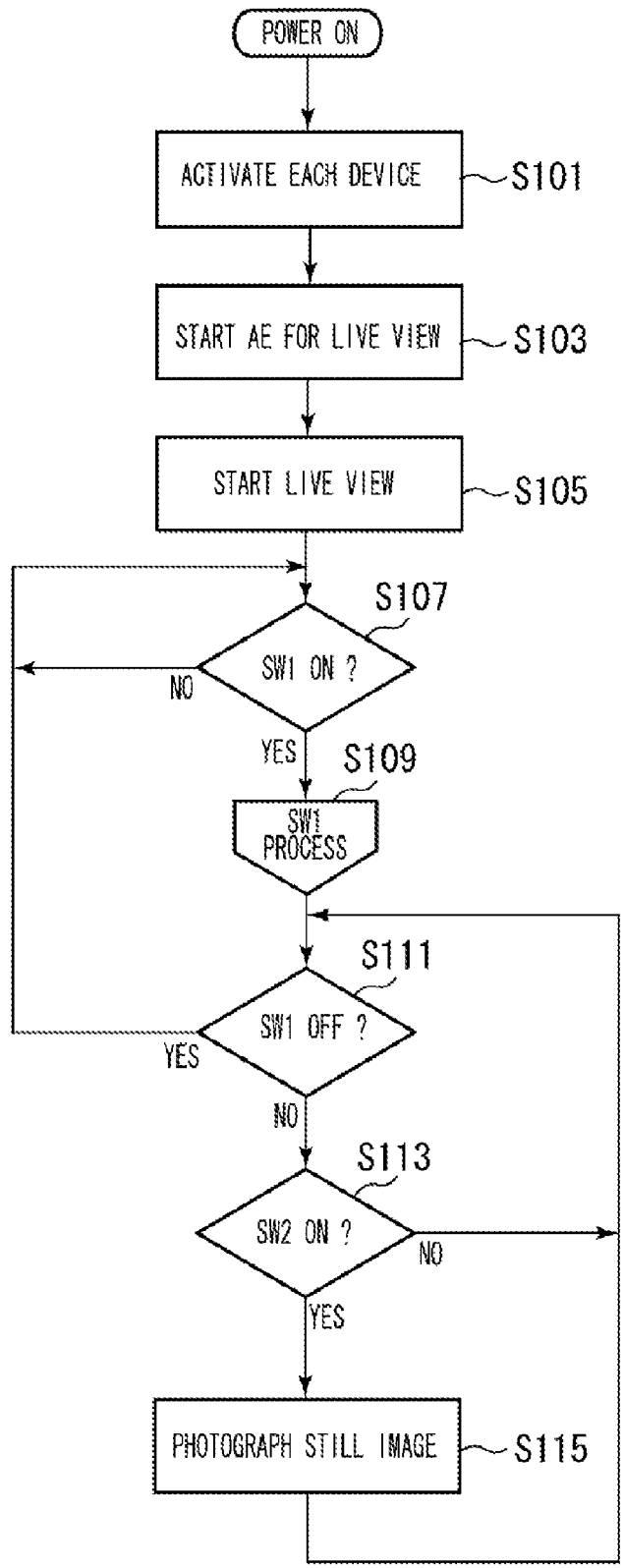
FIG. 9 is a flow chart illustrating a series of operations performed after the digital camera is activated according to an exemplary embodiment of the invention.

FIG. 9 is a flow chart illustrating operations of the digital camera 100 after the digital camera 100 is actuated.

After a power switch 102, which is included in an operation unit 70 of the digital camera 100, is pressed, then in step S101, the digital camera 100 initializes each device required for photographing an object. If a lens barrel including the lens 10 is of an extending type, the digital camera 100 extends the lens barrel and initializes and activates a large-scale integrated circuit (LSI) and a central processing unit (CPU), such as the image processing circuit 50, mounted in the digital camera 100.

When the image display device 108 is used as a viewfinder of the digital camera 100 to output a live image of an object, in step S103, the digital camera 100 starts a continuous AE control operation for the live view to control an exposure of the live image in an appropriate manner. After the continuous AE control operation starts, the exposure is continuously controlled according to a luminance change of the object. The focus control can include a continuous mode, in which a focus is constantly adjusted to a main object, and a one-shot mode, in which a focus is adjusted only upon a photographing preparation. Consequently, the focus is not always adjusted each time the live image is output, but there is a case where only a focusing lens is driven to a predetermined position. Thus, such a step is not illustrated in FIG. 9.

After completing a preparation for outputting the live image, in step S105, the digital camera 100 starts outputting the live image to the image display device 108. A user can check the live image displayed on the image display device 108 to perform framing of the object, namely, the user uses the image display device 108 as an electronic viewfinder. The user also can operate the digital camera 100 so as not to display the live image on the image display device 108. In such a case, the optical viewfinder 106 is used as a camera viewfinder.

Figure 10:
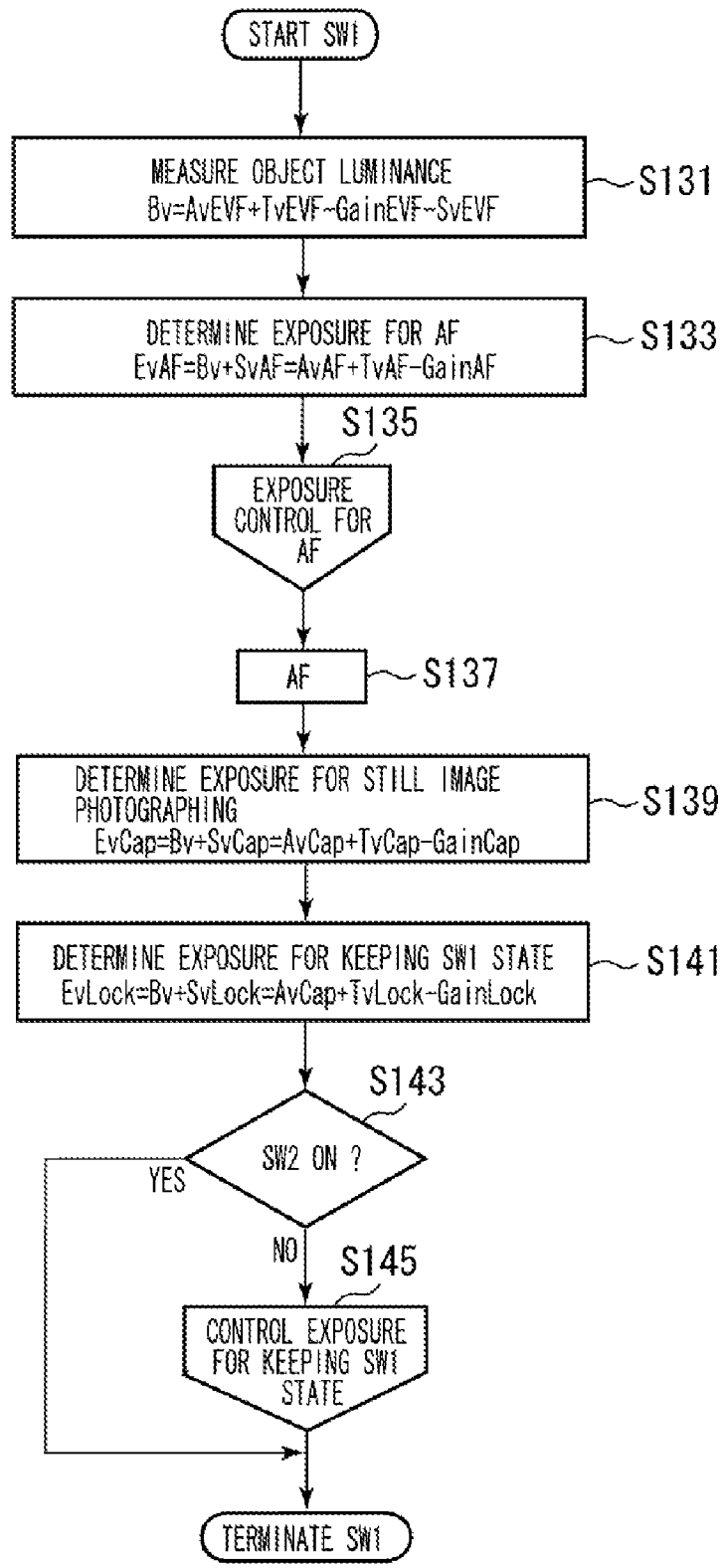
FIG. 10 is a flow chart illustrating a series of processes performed after a release button is pressed to place it in an SW1 state in the digital camera according to an exemplary embodiment of the invention.

After the digital camera 100 provides the user with the viewfinder function, the digital camera 100 allows the user to press the release button 104. In step S107, the digital camera 100 determines whether the release button 104 is pressed to place it in the SW1 state to adjust an exposure and a focus. If the digital camera 100 determines that the release button 104 is pressed to place it in the SW1 state (YES in step S107), an SW1 process of step S109 as illustrated in FIG. 10 is performed to determine an exposure and a focus depending on the object. After completing the SW1 process, the digital camera 100 determines whether the SW2 button is turned ON in step S113 or the SW1 button is turned OFF in step S111 to stop photographing. If the digital camera 100 determines that the SW2 button is turned ON (YES in step S113), then in step S115, the digital camera 100 photographs a still image. If the digital camera 100 determines that the SW1 button is turned OFF (YES in step S111), the digital camera 100 returns to a photographing standby state (S107).

FIG. 10 is a flow chart illustrating a process after the release button 104 is pressed to place it in the SW1 state.

Immediately before the release button 104 is pressed to place it in the SW1 state, the continuous AE control operation for the live view is performed in step S103, such that the exposure is set to an aperture value, a shutter speed, and a gain value defined with the EVF program diagram illustrated in FIG. 4. In step S131, the digital camera 100 measures an object luminance Bv using the aperture value AvEVF, the shutter speed TvEVF, the gain GainEVF, set at the time when the release button 104 is pressed to place it in the SW1 state, and a sensitivity SvEVF determined by driving of the image sensor 16.

$$Bv = AvEVF + TvEVF - GainEVF - SvEVF$$

Then, the digital camera 100 obtains an exposure for the AF control operation based on the program diagram for the AF control, in which an exposure value EvAF is initially obtained to draw the program diagram. Here, the object luminance Bv obtained as described above and the sensitivity SvAF determined by driving of the image sensor 16 upon AF control are used.

$$EvAF = Bv + SvAF$$

In step S133, the digital camera 100 obtains the aperture value, the shutter speed, and the gain value for AF control based on the program diagram using the obtained exposure value EvAF.

$$EvAF = AvAF + TvAF - GainAF$$

In step S135, the digital camera 100 keeps the exposure for AF control and, in step S137, adjusts a focus to an object with the exposure.

Then, the digital camera 100 determines two exposures after completing the AF control, an exposure for photographing a still image in step S139 and an exposure for keeping the SW1 state in step S141. The exposure for photographing a still image is obtained such that a combination of an aperture value, a shutter speed, and a gain is obtained based on the program diagram for photographing a still image illustrated in FIG. 6. Initially, an exposure value EvCap for drawing the program diagram is obtained. The above obtained object luminance By and a sensitivity SvCap for photographing a still image are used.

$$EvCap = Bv + SvCap$$

The digital camera 100 uses the above obtained exposure value EvCap to draw the program diagram.

$$EvCap = AvCap + TvCap - GainCap$$

Subsequently, in determining the exposure for the SW1 keeping state, the digital camera 100 uses the above obtained object luminance By and a sensitivity SvLock determined by driving of the image sensor 16 upon the SW1 keeping state to obtain an exposure value EvLock.

$$EvLock = Bv + SvLock$$

The digital camera 100 determines the aperture value, the shutter speed, and the gain value based on the exposure value EvLock according to the following sequence without using the program diagram. Initially, the aperture value is determined to be AvCap for the purpose of shortening the time lag after the release button 104 is pressed to place it to the SW2 state. Then, the digital camera 100 selects the shutter speed TvLock capable of realizing the exposure value EvLock. If the exposure value EvLock cannot be realized because of a bright object luminance or a dark object luminance, the digital camera 100 determines the gain GainLock so as to realize the exposure value EvLock with the gain.

In step S143, the digital camera 100, before controlling the exposure to the determined SW1 keeping state, determines whether the release button 104 is fully pressed to place it in the SW2 state, namely, whether the SW2 button is ON. If the user has already pressed the release button 104 to place it in the SW2 state (YES in step S143), the digital camera 100 recognizes that the SW1 state has been completed without controlling the exposure to the SW1 keep state, since it is not required to control the exposure to the SW1 keeping state to output the live image to the image display device 108. If the release button 104 is not pressed to place it in the SW2 state (NO in step S143), then in step S145, the digital camera 100 controls the exposure to the SW1 keeping state to realize the viewfinder function under the SW1 keeping state.

Figure 11:
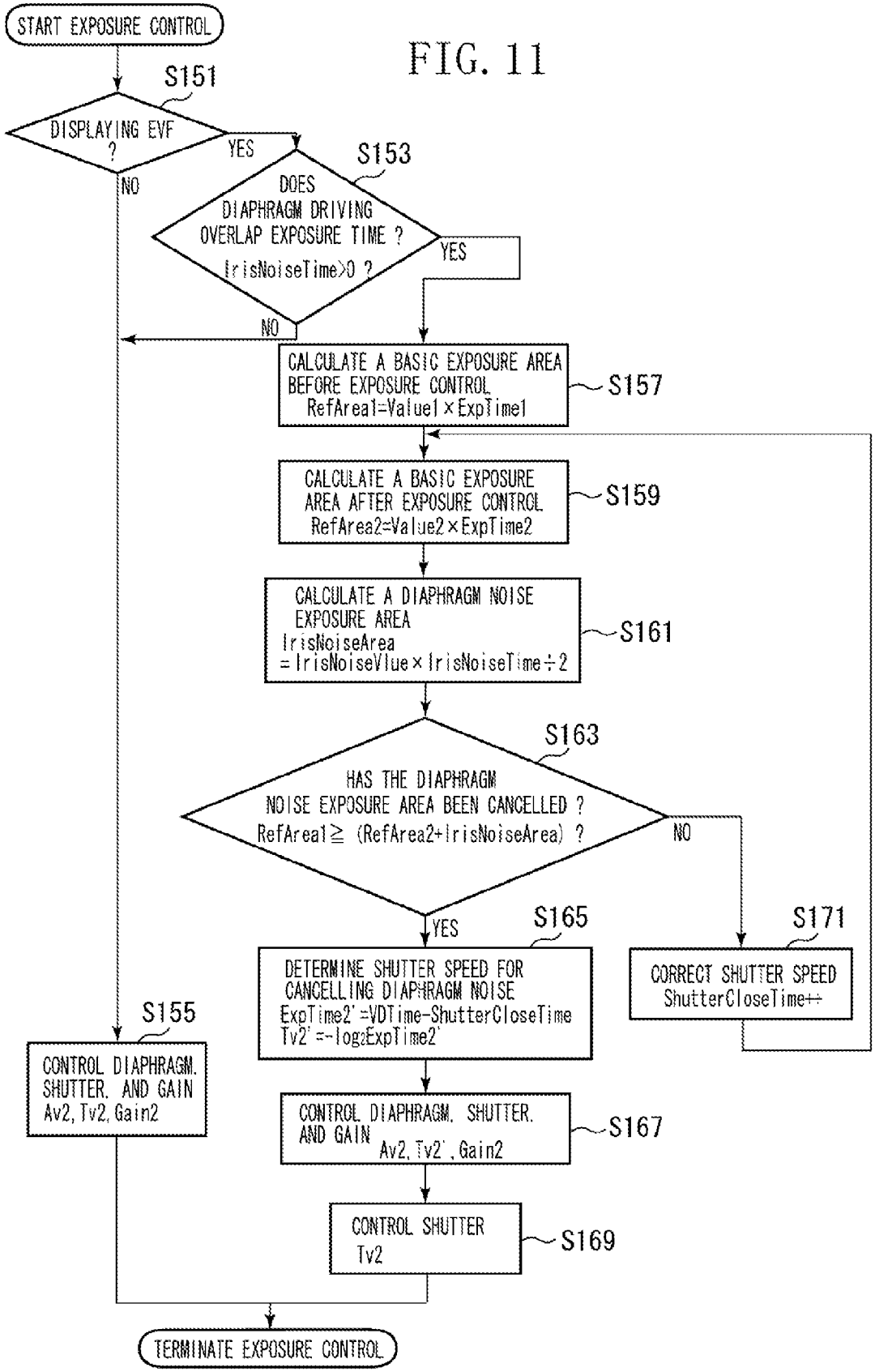
FIG. 11 is a flow chart illustrating operations of the digital camera upon exposure control according to an exemplary embodiment of the invention.

FIG. 11 is a flow chart illustrating operations of the digital camera 100 upon controlling the exposure. When this flow is executed, an aperture value Av1, a shutter speed Tv1, and a gain value Gain1, which have already been set, and an aperture value Av2, a shutter speed Tv2, and a gain value Gain2, which are target values to be set next, are defined. Parameters used in the flow illustrated in FIG. 11 correspond to values indicated in a timing diagram illustrated in FIG. 12.

Since the present exemplary embodiment is directed to minimizing an image quality deterioration caused by driving of the diaphragm 14 with regard to an image output to the electronic viewfinder, in step S151, the digital camera 100 initially determines whether there is an output to the electronic viewfinder. If the electronic viewfinder is OFF (NO in step S151), the digital camera 100 determines that the optical viewfinder 106 is being used. Thus, the digital camera 100 does not perform a correction for an exposure variation caused by driving of the diaphragm 14. Also, even in the case where the electronic viewfinder is ON (YES in step S151), if the digital camera 100 determines that driving of the diaphragm 14 does not overlap the exposure time (NO in step S153), the digital camera 100 does not correct an exposure variation caused by driving of the diaphragm 14. In the case where no correction is performed, then in step S155, the digital camera 100 controls the exposure to the aperture value Av2, the shutter speed Tv2, and the gain value Gain2, which are the target values.

Whether driving of the diaphragm 14 overlaps the exposure time is determined using IrisNoiseTime, which is a difference between the diaphragm driving time IrisMoveTime and the shutter closing time ShutterCloseTime. When the IrisNoiseTime has a positive value, it is considered that driving of the diaphragm 14 overlaps the exposure time. The diaphragm drive time IrisMoveTime can be calculated based on a diaphragm driving amount (Av2−Av1) and a diaphragm driving speed IrisSpeed. The shutter closing time ShutterCloseTime can be calculated based on an exposure time ExpTime2 and a vertical synchronizing signal cycle VDTime at the target shutter speed.

$$IrisMoveTime = (Av2 - Av1)/IrisSpeed$$

$$ShutterCloseTime = VDTime - ExpTime2$$

Subsequently, in steps S157, S159, and S161, the digital camera 100 calculates an amount of exposure before the exposure control, an amount of exposure after the exposure control, and an amount of exposure corresponding to the exposure variation caused by driving of the diaphragm 14 (shaded areas in FIG. 12).

The amount of exposure before the exposure control is calculated as follows in step S157:

$$RefArea1 = Value1 \times ExpTime1$$

Since the Av value and the Tv value are expressed with a logarithmically-compressed unit system, the values are calculated such that the powers of two are applied to a Value* and ExpTime* for logarithmical decompression. Also, Value expresses Value1 with reference to Value2 after the exposure control.

The amount of exposure after the exposure control is calculated as follows in step S159:

$$RefArea2 = Value2 \times ExpTime2$$

If there is no exposure variation due to driving of the diaphragm 14, an area representing the amount of exposure Area1 before the exposure control is equal to an area representing the amount of exposure Area2 after the exposure control.

The exposure variation due to driving of the diaphragm 14 is calculated as follows in step S161:

$$IrisNoiseArea = IrisNoiseValue \times IrisNoiseTime/2$$

The IrisNoiseValue represents an aperture change value upon starting the exposure when the shutter speed is controlled to the target shutter speed Tv2. Also, in the present exemplary embodiment, driving of the diaphragm 14 is controlled linearly up to the target aperture value. Further, driving of the diaphragm 14 is controlled in synchronization with the shutter closing timing. However, such control may not be applicable to some diaphragm. In such a case, a calculation method for IrisNoiseArea can be changed according to a diaphragm drive characteristic or a drive start delay time.

After calculating each amount of exposure, in step S163, the digital camera 100 checks whether the exposure variation due to driving of the diaphragm is corrected based on a relationship between the areas.

The digital camera 100 compares RefArea1 with a combination of RefArea2 and IrisNoiseArea. If the combination of RefArea2 and IrisNoiseArea is larger than RefArea1 (NO in step S163), the digital camera 100 determines that the exposure variation due to driving of the diaphragm 14 is not corrected. Then, in step S171, the digital camera 100 changes the shutter speed in a correction direction by a predetermined amount. Then, the digital camera 100 calculates RefArea2 and IrisNoiseValue again in steps S159 and S161, and compares RefArea1 with a combination of RefArea2 and IrisNoiseArea in step S163. As described above, the digital camera 100 continuously corrects the shutter speed until the value of the combination of RefArea2 and IrisNoiseArea becomes approximately equal to the amount of exposure RefArea1.

If RefArea1 is equal to or larger than the combination of RefArea2 and IrisNoiseArea, i.e., the correction shutter speed ShutterCloseTime is determined (YES in step S163), then in step S165, the digital camera 100 calculates a correction exposure time ExpTime2' based on a difference between the correction shutter speed ShutterCloseTime and the vertical synchronizing signal VDTime and sets Tv2' as the correction shutter speed.

$$ExpTime2'=VDTime-ShutterCloseTime$$

$$Tv2'=-\log_2(ExpTime2')$$

In step S167, the digital camera 100 uses the determined correction shutter speed Tv2' to control an exposure together with the target aperture value Av2 and the target gain value Gain2. While the digital camera 100 controls the exposure, the exposure variation due to driving of the diaphragm 14 is cancelled with the correction shutter speed Tv2', thus preventing a deteriorated image from being output to the viewfinder. Then, after completing driving of the diaphragm 14, in step S169, the digital camera 100 controls the shutter speed to the original target value Tv2 to complete a series of correction processes.

In the flowchart illustrated in FIG. 11, the digital camera 100 corrects the shutter speed with a process of step S165 to cancel the exposure variation caused by driving of the diaphragm 14. However, there is a case where the exposure variation is cancelled using a gain value. In such a case, a flow calculation is performed to correct a vertical value of the exposure area IrisNoiseArea and the obtained value is replaced with the gain value to perform a correction with the gain value.

With the above-described exemplary embodiment, the exposure variation caused by driving of the diaphragm 14 can be corrected to provide an electronic viewfinder with a high quality.

In the above-described exemplary embodiment, either a charge accumulation time or a gain is controlled to compensate for an exposure variation. However, both a charge accumulation time and a gain can be controlled to compensate for an exposure variation.

Other Exemplary Embodiments

The following method also can produce a similar effect to that produced according to the above-described exemplary embodiment. Namely, another exemplary embodiment provides a storage medium (or a recording medium) storing program code of software that achieves the functions of the above-described exemplary embodiment to a system or a device. Then, a computer (or CPU or MPU) of the system or the device reads and executes the program code stored in the storage medium. In this case, the program code itself read from the storage medium achieves the functions of the above-described exemplary embodiment, such that the storage medium storing the program code constitutes the present invention. The present invention also encompasses the following case in addition to the case where the functions of the above-described exemplary embodiment are realized by executing the program code read by the computer. Namely, an operating system (OS) running on the computer carries out apart of or the whole of the actual processing based on a command of the program code, thereby realizing the functions of the above-described exemplary embodiment.

Further, the following case can be encompassed within the present invention. Namely, the program code read from the storage medium is written in a memory of a function expansion unit connected to the computer or a function expansion card inserted in the computer. Then, the CPU of the function expansion card or the function expansion unit performs a part of or the whole of the process based on the command of the program code, thereby realizing the functions of the above-described exemplary embodiment.

When the present invention is applied to the above-described storage medium, the storage medium stores program code corresponding to the above-described processes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
an imaging unit including an image sensor configured to photoelectrically convert an object image to accumulate electric charge;
a diaphragm control unit configured to control an aperture value of a diaphragm configured to adjust an amount of light incident on the image sensor; and
an adjustment unit adjust a length of a charge accumulation period of the image sensor by adjusting a driving timing of the image sensor,
wherein, if driving of the diaphragm overlaps a charge accumulation period when the aperture value is changed from a first aperture value to a second aperture value, the adjustment unit adjusts the length of the charge accumulation period that driving of the diaphragm overlaps, such that an amount of exposure of the imaging unit of the charge accumulation period that a first aperture value is set and an amount of exposure of the imaging unit of the charge accumulation period that the driving of the diaphragm overlaps become approximately equal to each other.

2. An imaging apparatus comprising:
an imaging unit including an image sensor configured to photoelectrically convert an object image to accumulate electric charge;
a diaphragm control unit configured to control an aperture value of a diaphragm configured to adjust an amount of light incident on the image sensor; and
a gain control unit configured to control a gain of an image signal output from the imaging unit,
wherein, if driving of the diaphragm overlaps a charge accumulation period when the aperture value is changed from a first aperture value to a second aperture value, the gain control unit controls a gain which corresponds to the charge accumulation period that the driving of the diaphragm overlaps such that an amount of exposure of the imaging unit of the charge accumulation period that a first aperture value is set and an amount of exposure of the imaging unit of the charge accumulation period that the driving of the diaphragm overlaps become approximately equal to each other.

3. An imaging apparatus comprising:
an imaging unit including an image sensor configured to photoelectrically convert an object image to accumulate electric charge;
a display unit configured to display an image signal output from the imaging unit;
a diaphragm control unit configured to control an aperture value of a diaphragm configured to adjust an amount of light incident on the image sensor; and
an adjustment unit configured to adjust a length of a charge accumulation period of the image sensor by adjusting a driving timing of the image sensor,
wherein, when a live view operation for causing the image sensor to sequentially accumulate electric charge and causing the display unit to display an image signal sequentially output from the imaging unit is performed and if driving of the diaphragm overlaps a charge accumulation period when the aperture value is changed from a first aperture value to a second aperture value, the adjustment unit adjusts the length of the charge accumulation period that driving of the diaphragm overlaps such that an amount of exposure of the imaging unit of the charge accumulation period that a first aperture value is set and an amount of exposure of the imaging unit of the charge accumulation period that the driving of the diaphragm overlaps become approximately equal to each other.

4. An imaging apparatus comprising:
an imaging unit including an image sensor configured to photoelectrically convert an object image to accumulate electric charge;
a display unit configured to display an image signal output from the imaging unit;
a diaphragm control unit configured to control an aperture value of a diaphragm configured to adjust an amount of light incident on the image sensor; and
a gain control unit configured to control a gain of the image signal,
wherein, when a live view operation for causing the image sensor to sequentially accumulate electric charge and causing the display unit to display an image signal sequentially output from the imaging unit is performed and if driving of the diaphragm overlaps a charge accumulation period when the aperture value is changed from a first aperture value to a second aperture value, the gain control unit controls a gain which corresponds to the charge accumulation period that the driving of the diaphragm such that an amount of exposure of the imaging unit of a first charge accumulation period and an amount of exposure of the imaging unit of the charge accumulation period that the driving of the diaphragm overlaps become approximately equal to each other.

5. An imaging apparatus comprising:
an imaging unit including an image sensor configured to photoelectrically convert an object image to accumulate electric charge;
a diaphragm control unit configured to control an aperture value of a diaphragm configured to adjust an amount of light incident on the image sensor;
an adjustment unit configured to adjust a length of a charge accumulation period of the image sensor by adjusting a driving timing of the image sensor; and
a gain control unit configured to control a gain of an image signal output from the imaging unit,
wherein, if driving of the diaphragm overlaps a charge accumulation time when the aperture value is changed from a first aperture value to a second aperture value, the adjustment unit adjusts the length of the charge accumulation period that the driving of the diaphragm overlaps and the gain control unit controls the gain which corresponds to the charge accumulation period that the driving of the diaphragm overlaps, such that a amount of exposure of the imaging unit of a first charge accumulation period and an amount of exposure of the imaging unit of the charge accumulation period that the driving of the diaphragm overlaps become approximately equal to each other.

6. A method for controlling an imaging apparatus which includes an imaging unit including an image sensor, a diaphragm control unit and diaphragm, and an adjustment unit, the method comprising:
via the imaging unit including an image sensor, photoelectrically converting an object image to accumulate electric charge;
via the diaphragm control unit, controlling an aperture value of the diaphragm to adjust an amount of light incident on the image sensor; and
via the adjustment unit, adjusting a length of a charge accumulation period of the image sensor by adjusting a driving timing of the image sensor,
wherein, if driving of the diaphragm overlaps a charge accumulation period when the aperture value is changed from a first aperture value to a second aperture value, the adjustment unit adjusts the length of the charge accumulation period that driving of the diaphragm overlaps, such that an amount of exposure of the imaging unit of the charge accumulation period that a first aperture value is set and an amount of exposure of the imaging unit of the charge accumulation period that the driving of the diaphragm overlaps become approximately equal to each other.

7. A method for controlling an imaging apparatus including an imaging unit having an image sensor, a diaphragm control unit and diaphragm, and gain control unit, the method comprising:
via the imaging unit including the image sensor, photoelectrically converting an object image to accumulate electric charge;
via the diaphragm control unit, controlling the aperture value of the diaphragm to adjust an amount of light incident on the image sensor; and
via the gain control unit, controlling the gain of an image signal output from the imaging unit,
wherein, if driving of the diaphragm overlaps a charge accumulation period when the aperture value is changed from a first aperture value to a second aperture value, the gain control unit controls a gain which corresponds to the charge accumulation period that the driving of the diaphragm overlaps such that an amount of exposure of the imaging unit of the charge accumulation period that a first aperture value is set and an amount of exposure of the imaging unit of the charge accumulation period that the driving of the diaphragm overlaps become approximately equal to each other.

8. A method for controlling an imaging apparatus having an imaging unit including an image sensor, a display unit, a diaphragm control unit and diaphragm, and an adjustment unit, the method comprising:

via the imaging unit including the image sensor, photoelectrically converting an object image to accumulate electric charge;

via the display unit, displaying an image signal output from the imaging unit;

via the diaphragm control unit, controlling an aperture value of the diaphragm to adjust an amount of light incident on the image sensor; and via the adjustment unit, adjusting the length of a charge accumulation period of the image sensor by adjusting a driving timing of the image sensor, wherein, when a live view operation for causing the image sensor to sequentially accumulate electric charge and causing the display unit to display an image signal sequentially output from the imaging unit is performed and if driving of the diaphragm overlaps a charge accumulation period when the aperture value is changed from a first aperture value to a second aperture value, the adjustment unit adjusts the length of the charge accumulation period that driving of the diaphragm overlaps such that an amount of exposure of the imaging unit of the charge accumulation period that a first aperture value is set and an amount of exposure of the imaging unit of the charge accumulation period that the driving of the diaphragm overlaps become approximately equal to each other.

9. A method for controlling an imaging apparatus including an imaging unit having an image sensor, a display unit, a diaphragm control unit and diaphragm, and a gain control unit, the method comprising:

via the imaging unit including the image sensor, photoelectrically converting an object image to accumulate electric charge;

via the display unit, displaying an image signal output from the imaging unit;

via diaphragm control unit, controlling an aperture value of a diaphragm configured to adjust an amount of light incident on the image sensor; and via the gain control unit, controlling a gain of the image signal, wherein, when a live view operation for causing the image sensor to sequentially accumulate electric charge and causing the display unit to display an image signal sequentially output from the imaging unit is performed and if driving of the diaphragm overlaps a charge accumulation period when the aperture value is changed from a first aperture value to a second aperture value, the gain control unit controls a gain which corresponds to the charge accumulation period that the driving of the diaphragm such that an amount of exposure of the imaging unit of a first charge accumulation period and an amount of exposure of the imaging unit of the charge accumulation period that the driving of the diaphragm overlaps become approximately equal to each other.

10. A method for controlling an imaging apparatus including an imaging unit having an image sensor, a diaphragm control unit and diaphragm, an adjustment unit, and a gain control unit, the method comprising:

via the imaging unit including the image sensor, photoelectrically converting an object image to accumulate electric charge;

via the diaphragm control unit, controlling an aperture value of the diaphragm to adjust an amount of light incident on the image sensor;

via the adjustment unit, adjusting a length of a charge accumulation period of the image sensor by adjusting a driving timing of the image sensor; and via the gain control unit, controlling a gain of an image signal output from the imaging unit, wherein, if driving of the diaphragm overlaps a charge accumulation time when the aperture value is changed from a first aperture value to a second aperture value, the adjustment unit adjusts the length of the charge accumulation period that the driving of the diaphragm overlaps and the gain control unit controls the gain which corresponds to the charge accumulation period that the driving of the diaphragm overlaps, such that a amount of exposure of the imaging unit of a first charge accumulation period and an amount of exposure of the imaging unit of the charge accumulation period that the driving of the diaphragm overlaps become approximately equal to each other.

* * * * *